(12) United States Patent
Petroski et al.

(10) Patent No.: US 6,374,529 B1
(45) Date of Patent: Apr. 23, 2002

(54) PULLEY ACTION DECOY SYSTEM

(76) Inventors: Patrick A. Petroski, 2397 Woodward St., Portage, IN (US) 46368; Andrew P. Petroski, 6437 S. 600 East, Templeton, IN (US) 47986

(*) Notice: Subject to any disclaimer, the term of this patent is extended or adjusted under 35 U.S.C. 154(b) by 0 days.

(21) Appl. No.: 09/573,201

(22) Filed: May 18, 2000

Related U.S. Application Data
(60) Provisional application No. 60/148,338, filed on Aug. 12, 1999.

(51) Int. Cl.[7] ............................................. A01M 31/06
(52) U.S. Cl. ............................................................. 43/3
(58) Field of Search ............................................ 43/2, 3

(56) References Cited

U.S. PATENT DOCUMENTS

| | | | |
|---|---|---|---|
| 261,910 A | | 8/1882 | Cochel |
| 740,293 A | * | 9/1903 | Loeble .............................. 43/3 |
| 2,129,781 A | * | 9/1938 | Park .................................. 43/3 |
| 2,252,795 A | | 8/1941 | Weems et al. |
| 2,434,335 A | * | 1/1948 | Signalness ....................... 43/3 |
| 2,457,295 A | * | 12/1948 | Woodhead ...................... 43/3 |
| 2,546,189 A | | 3/1951 | Keep et al. |
| 2,663,108 A | | 12/1953 | Dixon et al. |
| 3,016,647 A | * | 1/1962 | Peterson ......................... 43/3 |
| 4,141,167 A | | 2/1979 | Muehl |
| 4,535,560 A | | 8/1985 | O'Neil |
| 4,566,214 A | | 1/1986 | McCrory et al. |
| 4,599,819 A | | 7/1986 | Voges, Jr. et al. |
| 4,612,722 A | | 9/1986 | Ferrell |
| 4,910,905 A | | 3/1990 | Girdley et al. |
| 5,377,439 A | | 1/1995 | Roos et al. |
| 5,974,720 A | * | 11/1999 | Bowling ......................... 43/3 |
| 6,138,398 A | * | 10/2000 | Capps ............................. 43/3 |

FOREIGN PATENT DOCUMENTS

| | | |
|---|---|---|
| CA | 470981 | 1/1951 |
| FR | 2671691 | 7/1992 |
| FR | 2671694 | 7/1992 |

* cited by examiner

Primary Examiner—Kurt Rowan
(74) Attorney, Agent, or Firm—Richard C. Litman

(57) ABSTRACT

The present pulley action decoy system enables a single hunter or other person to simultaneously and collectively move a series of waterfowl decoys floating in a shallow body of water, to simulate the movement of a resting flock of waterfowl. The decoys may be distributed in an apparently random pattern, but are linked by a single actuation line, with branches optionally extending from the line. The distal end of the line, and branch or auxiliary lines extending therefrom, are secured to anchor posts or stakes and are provided with springs or other resilient means enabling the body of the line to move resiliently when the first end of the line is drawn by a hunter or person in a blind or other location. One or more corner posts or stakes are used to guide the line at each point where a change in the direction of the line occurs. The present system may accommodate a large number of changes of direction and/or decoys installed upon the line, due to the low friction pulley action provided at each post or stake. An additional mechanism simulates the action of a waterfowl dipping its head downwardly to feed on the shallow bottom. The present system is modular, with the hunter or other person assembling the various components of the system as desired according to the depth of the water in which the system is to be installed, the particular orientation of the run of the actuation line, and/or other factors.

20 Claims, 12 Drawing Sheets

PULLEY ACTION DECOY SYSTEM

REFERENCE TO RELATED PATENT APPLICATION

This application claims the benefit of U.S. Provisional Patent Application Serial No. 60/148,338, filed on Aug. 12, 1999.

BACKGROUND OF THE INVENTION

1. Field of the Invention

The present invention relates generally to the field of small game hunting, and more specifically to a decoy system for use in bird hunting, particularly waterfowl hunting. The present invention comprises a system of activation lines, pulleys, stakes, and springs, along which one or more decoys are attached. Pulling one end of the system of lines causes the decoy(s) to move over the surface of the water upon which they are floating, and/or to dip downwardly as though feeding on the shallow bottom.

2. Description of the Related Art

Early man evolved as a hunter, and many people find this activity enjoyable as a hobby even today. Accordingly, hunters have developed innumerable means for attracting and capturing wild game in the field. As an example, the use of floating and/or other decoys is well known for attracting waterfowl (e. g., ducks, geese, etc.) to concealed hunters.

However, conventional decoys are inanimate objects, and do not provide the movement required to simulate real waterfowl resting or swimming on the surface of a body of water. The unrealistic appearance of stationary, inanimate decoys floating on the surface, has proven to be less than optimally effective in attracting other waterfowl flying overhead, and causing those waterfowl to join the decoys in order to come within range of the hunter(s).

As a result, various mobile decoys have been developed, including individual decoys having remotely controlled movement and other features. Perhaps one of the most cost effective systems is that where a relatively long line is attached to one or more floating decoys, with the decoys moving over the surface of the water when the line is pulled by a hunter in a remotely located blind. Such prior art systems, however, still have not been developed to provide optimum effect in attracting waterfowl, particularly in their limited configurations. Such prior art systems are relatively limited in the number of decoys which may be controlled, the environment in which they are operable, and/or the action which they may impart to the decoy(s).

Accordingly, a need will be seen for a pulley action decoy system which is capable of controlling a relatively large number of decoys, distributed randomly about an area. The system must provide not only for horizontal movement of the various decoys, but must also provide a tipping or dipping action for one or more decoys, to simulate feeding on the bottom. The present system is not limited to linear movement of a single string of decoys, but rather provides apparently independent movement to each of a series of decoys by means of the multiple pulley and anchor stakes of the present system, to simulate more realistically the actions of a plurality of waterfowl upon a body of shallow water.

A discussion of the related art of which the present inventor is aware, and its differences and distinctions from the present invention, is provided below.

U.S. Pat. No. 261,910 issued on Aug. 1, 1882 to Charles T. Cochel, titled "Decoy," describes various decoy embodiments. Cochel provides a series of decoys extended over a boat or blind for concealment thereof, with the apparently flying decoys being laterally movable for the hunter to fire from the boat after displacing the decoys. The simulated flying birds are not moved to attract live game birds, but are only moved from over the boat or blind when the game birds are in range in order to allow the hunter to fire on the game birds. A series of floating decoys is also provided, but no means is used to connect them to the boat for movement.

U.S. Pat. No. 2,252,795 issued on Aug. 19, 1941 to Charles L. Weems et al., titled "Decoy Gang Actuating Mechanism," describes a system comprising a pair of lateral lines with decoys strung therealong, with an actuating line secured to the center of each lateral line. The actuating line extends from its attachment to the lateral lines to a pulley opposite the blind, and back to the blind. The two lateral lines and their decoys are pulled away from the blind when the hunter draws on the actuating line, and are drawn back to their original positions by elastic cords at each end of each lateral line when the hunter relaxes his pull on the actuating line. The Weems et al. system is quite limited with respect to the present decoy system, with its potential for multiple branching lines, movement in directions other than toward and away from the blind, vertical movement of one or more decoys to simulate feeding, etc., which the simple Weems et al. system cannot achieve.

U.S. Pat. No. 2,546,189 issued on Mar. 27, 1951 to Edward C. Keep et al., titled "Wild Duck Decoy," describes a series of decoys each having a separate anchor line extending back to the boat or blind. One of the decoys includes a duck call, which is remotely pneumatically actuated by a bulb in the blind and an interconnecting pneumatic line to the decoy. However, Keep et al. make no suggestion that their decoys be moved by means of the anchor lines or pneumatic line, to simulate the movement of real waterfowl on the surface of the water. In any event, Keep et al. would require actuation of all of the lines, as each decoy has its own independent line and is not interconnected with the other decoys in the Keep et al. system, unlike the interconnected decoys of the present system.

U.S. Pat. No. 2,663,108 issued on Dec. 22, 1953 to Victor V. Dixon et al., titled "Animated Decoy And Actuating Means Therefor," describes a decoy having mechanisms for producing sound, tilting the head and body, and flapping the wings. However, the Dixon et al. decoy is fixed in one location and cannot move over the surface, as in the present decoy system. Moreover, Dixon et al. describe only a single decoy. While other like decoys could be deployed at a hunting location, each would have to be operated independently of one another, rather than collectively by a single control, as in the present decoy system. Even so, no movement over the surface of the water is provided by the Dixon et al. decoy, which remains staked in a single location, unlike the decoys of the present system.

U.S. Pat. No. 4,141,167 issued on Feb. 27, 1979 to Lawrence L. Muehl, titled "Waterfowl Decoy Setting Means," describes a system having a highly elastic section attached to a movable anchor weight, with an inelastic section of line extending from the elastic section to the hunter. The anchor weight is tossed into the water some distance from the hunter to string out the line, and the inelastic portion of the line is retrieved. Decoys are installed in series along the inelastic line, which is progressively released for the elastic to pull the line (and decoys) further out into the water. Additional "wing" lines may be extended from the main line, if desired. Muehl notes that his decoys may be moved by pulling on the shoreward line, but little, if any, movement would be imparted to the "wing" lines using his system. Rather, each "wing" line would have to be pulled separately, with the hunter disturbing his position from the blind and making his presence known to any game birds in the area. In contrast, the present system is operated using a single control line.

U.S. Pat. No. 4,535,560 issued on Aug. 20, 1985 to Jack O'Neil, titled "Duck Decoy Movement Apparatus," describes a system wherein the decoys are interconnected by a series of rigid tubes or the like to form a frame. The actuating mechanism is a motor with variable timing means, which periodically draws a line inwardly which is connected to the decoy frame assembly. The assembly is drawn back to its rest position by an elastic band attached to the frame opposite the motor reel line. The frame assembly results in all of the decoys performing precisely the same action, with no direct control by the hunter. Should the motor activate just as waterfowl are coming into range, the sudden collective movement may startle the birds, causing them to leave. In the present system, the hunter has complete control over the movement of the decoys, and their attachment to flexible cords or lines permits much more random movement than the rigid frame of the O'Neil assembly.

U.S. Pat. No. 4,566,214 issued on Jan. 28, 1986 to Michael L. McCrory et al., titled "Feeding Wildfowl Decoy," describes an electrically powered eccentric weight within a hollow decoy body or body portion. An electric motor spins the weight, which causes the decoy or portion to oscillate in the water as the center of gravity rotates about the center of the decoy or portion. McCrory does not provide any means of remotely shutting off the action of his decoy; the device will continue to run until the hunter physically gathers in the decoy and shuts off the switch. This may well drive some waterfowl away, as noted above in the discussion of the O'Neil decoy system above.

U.S. Pat. No. 4,599,819 issued on Jul. 15, 1986 to Alan M. Voges, Jr. et al., titled "Decoy Dabbler," describes an assembly having a single line with two decoys in series along the line. The spring attached anchor end is submerged in the water, with a submerged anchor holding down the actuation end of the line before it breaks the surface for actuation by the hunter. The hunter can only periodically pull and relax the line, with the spring at the distal end of the line taking up the slack, thus causing the decoys to move back and forth linearly along a fixed path. Moreover, Voges, Jr. et al. attach their decoys linearly along the line at two attachment points. Thus, the decoys cannot swivel, but are caused to move unnaturally backwards during some portion of their travel, unlike the present swivel attached decoys.

U.S. Pat. No. 4,612,722 issued on Sep. 23, 1986 to Mike C. Ferrell, titled "Random Movement, Motorized Water Fowl Decoy," describes a decoy containing a motor and using a small propeller as the drive means. The forward end of the keel of the decoy is attached to an anchor line, with a stabilizing fin (or rudder) extending rearwardly of the line attachment point. The decoy moves in a circle on the surface of the water, with the circle being defined by the length of the attachment line and the depth of the water to the anchor resting upon the bottom. As in the McCrory et al. decoy described further above, the Ferrell decoy runs continually until the hunter reaches the decoy and shuts off the mechanism, whereas the present decoy system is controlled directly by the hunter and his operation of the actuation line.

U.S. Pat. No. 4,910,905 issued on Mar. 27, 1990 to Gary J. Girdley et al., titled "Decoy System," describes a system utilizing a series of corner stakes with a single line passing through a ring attached to each stake. A number of decoys are secured along the line, between each of the corner stakes. An elastic band extends between the line and a distal anchor point. The Girdley et al. system may be set up to include several changes of direction in the travel of the actuation line, as in the present decoy system. However, the Girdley et al. system differs from the present system in that (1) Girdley et al. use rings, rather than pulleys, to guide their line at each corner stake, thus limiting the number of corner stakes they may put out and the change in direction of the line at each stake due to the higher friction of such ring attachments, as well as the number of decoys which may be installed along the length of the line; (2) the Girdley et al. system is not truly modular, as provided by the present system with its differently sized components which may be assembled in different relationships to allow for different water depths and decoy distribution patterns; (3) Girdley et al. do not disclose any multiple branching lines, as may be provided by the present system for greater realism, nor do they provide for any other action than horizontal movement on the surface of the water, whereas the present system provides such horizontal movement as well as providing a dipping or dunking action for one or more of the decoys as desired, to simulate a waterfowl feeding on the bottom of a shallow body of water.

U.S. Pat. No. 5,377,439 issued on Jan. 3, 1995 to Richard J. Roos et al., titled "Remote Controlled Decoy," describes a radio controlled decoy having several functions controlled by the hunter operating a radio transmitter. The decoy includes motive power means and steering means, as well as other functions. The Roos et al. decoy is thus more similar to the devices of the McCrory '214 and Ferrell '722 U.S. Patents than to the present decoy system, in that Roos et al. teach the operation of only a single decoy. As game waterfowl conventionally travel in flocks, the Roos et al. radio controlled single decoy would not provide particularly realistic action to attract a flock of live birds, whereas the collective motion of the decoys of the present system provide a much more realistic action.

Canadian Patent Publication No. 470,981 published on Jan. 23, 1951 to Paul D. Thompson, titled "Animated Decoys And Activating Mechanism Therefor," describes a decoy resembling the decoy of the Ferrell '722 U.S. Patent discussed further above, in that the decoy of the Thompson Canadian Patent Publication is also tethered and powered by an electric motor to operate in a generally circular arc, limited by the tether. The Thompson decoy includes additional operational features, but differs from the decoy system of the present invention in that it is only a single unit, rather than simulating a flock of waterfowl, and that the hunter must retrieve the Thompson decoy in order to deactivate it, rather than being able to retrieve it remotely by means of an actuation line operated by the hunter, as is the case with the present system.

French Patent Publication No. 2,671,691 published on Jul. 24, 1992 to Robert Nieto describes (according to the English abstract) a device which somewhat simulates the flight of a bird from one point to another. The simulated bird is tethered to a wire between the two points, and is tripped by a counterweight which causes the bird to descend along the initial part of the wire. No means is apparent for providing realistic action of the bird, nor for enabling the bird to pass upwardly along the second portion of the wire as it approaches the opposite perch. In any event, the mechanism is not suited for installation in a low body of water for simulating swimming and/or resting waterfowl, nor does the Nieto apparatus provide for the remote control of a series of decoys by a single activation line, as provided by the present invention.

Finally, French Patent Publication No. 2,671,694 published on Jul. 24, 1992 to Robert Nieto describes (according to the English abstract) a bird which is secured to the free end of a pivotally tethered arm. The arm may move in a vertical arc and is controlled by a tether line. When the tether line is released, the arm falls to the ground, with the bird providing a wing flapping action to simulate a live bird which is landing. The means for producing the flapping action is not disclosed. As in the Nieto '691 French Patent Publication discussed immediately above, the '694 apparatus does not provide for the simultaneous remote operation of a plurality of decoys, as is done with the present invention.

None of the above inventions and patents, either singly or in combination, is seen to describe the instant invention as claimed.

SUMMARY OF THE INVENTION

The present invention comprises a pulley action decoy system capable of providing simultaneous horizontal movement to a plurality of decoys distributed over the surface of a shallow body of water in an apparently random and non-linear pattern, thus providing greater realism than earlier decoys and decoy systems. The present system comprises a plurality of modular components, which may be interchangeably assembled to provide anchors suitable for temporary installation in bodies of water of various depths. The present system comprises an actuation line which extends from a hunter's blind, through a guide pulley and one or more corner pulleys to an anchor pulley. One or more springs or other resilient means may be installed in line along the actuation line, preferably at the anchor pulley.

The present system also provides for one or more branch lines extending therefrom, with further springs or resilient means installed therealong. One or more decoys may be removably installed along the actuation line (s), or along individual segments of the line(s) between corner and/or anchor stake(s) or post(s). If more than a single resilient member is used in the present system, the plural resilient members may have different spring rates, if desired, to provide different amounts of movement for decoys arrayed along different segments of the line. The present system also includes means for remotely momentarily drawing the head of a decoy downwardly to simulate dunking or feeding of a waterfowl on the bottom of a shallow body of water.

Accordingly, it is a principal object of the invention to provide an improved decoy system providing for the remote, simultaneous collective motion of a plurality of decoys deployed upon the surface of a body of water, by means of pulling a single actuation line to cause all of the decoys to move over the surface of the water, with the return of the actuation line being provided by at least one spring or resilient member deployed along the line.

It is another object of the invention to provide an improved decoy system providing for the deployment of a relatively large number of decoys and angular changes in the routing of the actuation line, by means of pulleys disposed at each corner stake in the system.

It is a further object of the invention to provide an improved decoy system which may include one or more branch lines extending from the primary actuation line.

An additional object of the invention is to provide an improved decoy system in which further spring means may be provided in any branch lines deployed with the present system, with the additional spring means having similar or different spring rates in comparison to the primary spring or resilient member.

Still another object of the invention is to provide an improved decoy system including means for simulating the dipping of a waterfowl to simulate a waterfowl feeding on the bottom of a shallow body of water.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a pulley action decoy system, wherein an actuating line is connected to one or more buoyant waterfowl (e. g., duck, goose, etc.) decoys for the simultaneous and collective movement of the decoys upon the surface of a body of water, for attracting live game birds to a hunter's blind or the like. The pulley system used in the present invention allows the hunter or other person to install a relatively large number of decoys along a relatively long actuating line (which may include additional branch or auxiliary lines extending therefrom), with the low friction provided by the pulleys enabling the hunter to manipulate and activate the decoys without undue line tension or force.

Moreover, the present system is modular, and may be set up in virtually any pattern desired by the hunter, to accommodate the specific configuration of the area in which the hunting activity is taking place. The modular nature of the present decoy system also allows different actions to be imparted to different decoys, depending upon the specific linkages and connections used.

Figure 1:
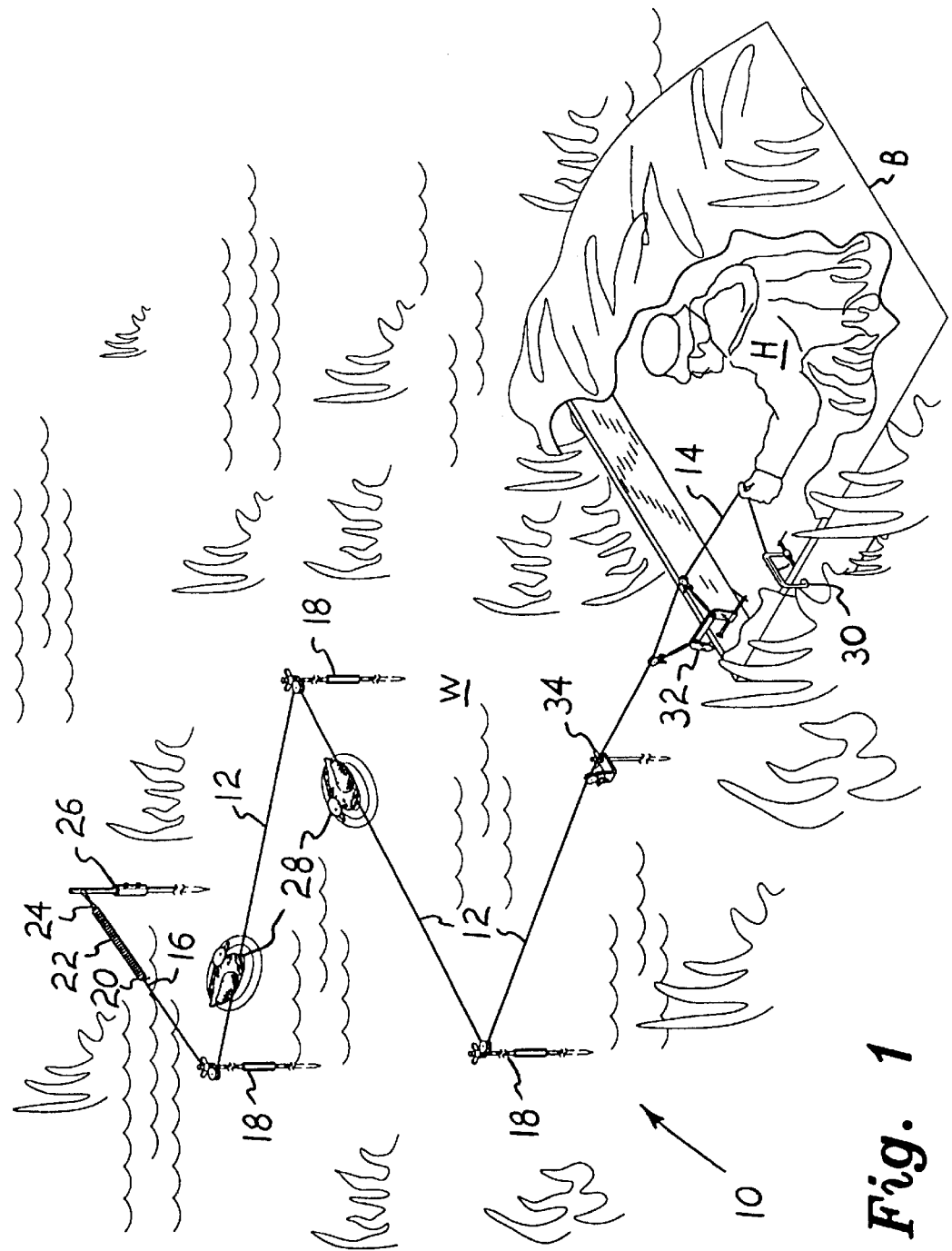
FIG. 1 is an environmental perspective view, showing an exemplary deployment of the present pulley action decoy system.

FIG. 1 illustrates a relatively simple exemplary deployment of the decoy system 10 in a shallow body of water W, typical of environments attractive to game birds such as ducks and geese. The system 10 essentially comprises a long and flexible actuating line 12 having an operating end 14 which is operated as desired by a hunter H or other person in a blind B or other location remote from the position(s) of the decoy(s). The opposite, distal or anchor end 16 of the line 10 is indirectly affixed remotely from the blind B, as described in detail further below.

The actuating line 12 passes through at least one corner stake assembly 18, thereby changing direction along its travel. (Various embodiments of such corner stakes are discussed further below.) The distal end 16 of the line 12 removably attaches to the first end 20 of a resilient member (e. g., coil spring 22, bungee cord, etc.), which in turn has an opposite second end 24 removably secured to an anchor stake assembly 26. One or more buoyant waterfowl decoys 28 are secured at various points along the line 12 as desired by the hunter. In the example of FIG. 1, a series of three corner stakes 18 are used, allowing the line 12 to pass around obstructions (marsh grass, etc.) and providing different directions of movement for the decoys 24 secured to the line 12 along runs between different corner stakes 18. While the various components are shown for clarity in FIG. 1, it will be understood that all of the above components excepting the decoys 24 and operating end 14 of the line 12 are concealed beneath the surface of the water W in an actual deployment of the system 10.

Additional components are removably secured within the blind B and immediately outside the blind B, to provide further guidance and security for the actuating line 12. A cord or line holder and tie-off clamp 30 is secured to some convenient location in the blind, and serves to secure the operating end 14 of the line 12 when the line 12 is not actually being drawn by the hunter H or operator. A guide pulley clamp 32 is also secured to the forward edge of the blind B, for guiding the line 12 from the blind B outwardly to the deployment area of the system 10. Finally, a guide pulley stake or post 34 is set outside of, but relatively close to, the blind B for guiding and holding the line 12 below the surface of the water W and providing a straight run for the line 12 to the first corner pulley 18.

Figure 2:
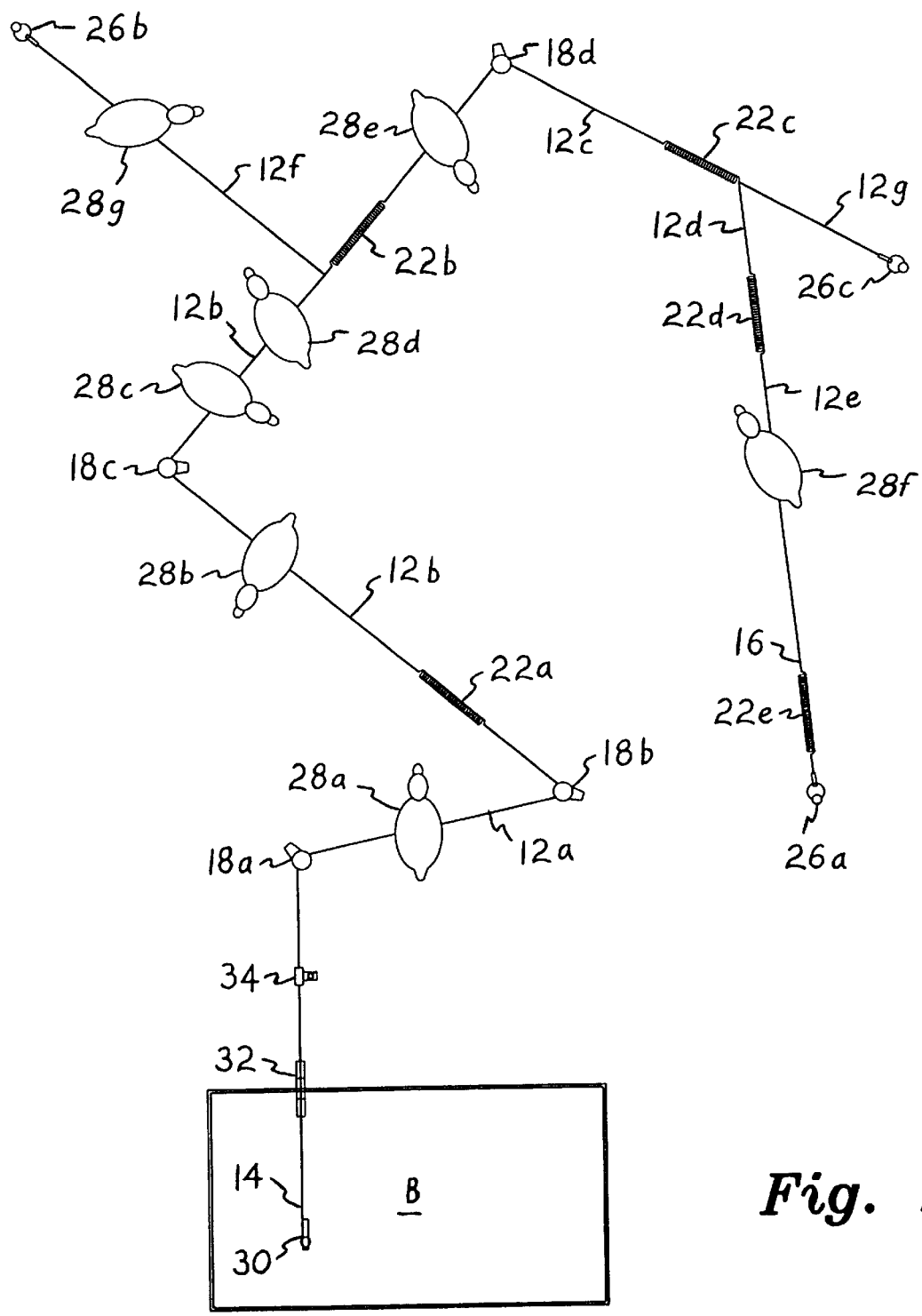
FIG. 2 is a schematic elevation view of another exemplary deployment, showing various features of the present system.

FIG. 2 provides a schematic plan view of another exemplary deployment of the present decoy system, designated as system 10a in FIG. 2. While essentially the same components are used in the systems of both FIGS. 1 and 2, it will be seen that the system 10a of FIG. 2 is somewhat more complex due to the use of additional corner posts or stakes, springs, and branching actuation lines. In the system 10a of FIG. 2, a first actuation line 12a extends from its operating end 14 attachment to the line holder clamp 30 in the blind B, past the guide pulley clamp 32 and guide pulley stake 34, and around two corner stakes, respectively 18a and 18b, to terminate at a first resilient member 22a. A second line 12b extends from the first resilient member 22a and around a third corner stake 18c to terminate at a second resilient member 22b.

From the second resilient member 22b (spring, etc.), a third line or cord segment 12c extends about a fourth corner stake 18d and terminates at a third resilient member 22c. Yet another line segment 12d extends from the fourth corner stake 18d to a fourth resilient member 22d, with a further line segment 12e extending between the fourth resilient member 22d and a fifth resilient member 22e, with the resilient member or spring 22e being secured to an anchor stake 26a.

The system 10a of FIG. 2 also includes branching lines 12f and 12g, respectively extending from the main line or cord 12b and connection of the resilient member 22c and line or cord 12d. The first auxiliary or branching line 12f is anchored to an auxiliary anchor stake or post 26b, with the second auxiliary branch line 12g being affixed to a second auxiliary anchor stake 26c. It will be seen that such branching lines may be installed at any practicable points extending from the main line comprising segments 12a through 12e and resilient members or springs 22a through 22e, as desired. Such branching lines may or may not include further resilient members, as desired by the hunter or other party deploying the system and depending upon the specific features of the location where the system is deployed.

A series of six decoys 28a through 28f is installed along the main line segments 12a through 12e, with a seventh decoy 28g placed along the first auxiliary or branch line 12f. The first decoy 28a is placed along the first line segment 12a, with the second through fourth decoys 28b through 28d installed along the second line segment 12b. A fifth decoy 28e is placed along the third line segment 12c, with a sixth decoy 28f along the fifth line segment 12e. As in the case of the specific arrangement of the line segments, any practicable number of decoys may be used as desired.

It will be seen that drawing on the operating end 14 of the first line or cord segment 12a of the system 10a of FIG. 2, will result in the movement of the first decoy 28a generally from right to left in the arrangement of FIG. 2, between the two corner stakes or posts 18a and 18b. The line segment 12a also exerts a pull on the second line segment 12b through the resilient member or spring 22a, resulting in the second decoy 28b moving along the path of the second line segment 12b toward the second corner stake 18b. The third and fourth decoys 28c and 28d will move generally along the path of the second line segment 12b established between the third and fourth corner stakes 18c and 18d, toward the third stake 18c. (The movement path of the decoys 28c and 28d is not precisely on a straight line between the two stakes 18c and 18d, due to the auxiliary or branching line 12f secured to the end of the second line segment 12b, adjacent its connection to the second resilient member 22b.) However, the magnitude of the movement of the second through fourth decoy 28b through 28d will be somewhat less than that of the first decoy 28a, as the first spring 22a will stretch to a certain extent as the first line segment 12a is pulled.

In a similar manner, the fifth decoy 28e will be drawn generally toward the third corner stake 18c, but the magnitude of its movement will be even less than that of the second through fourth decoys 28b through 28d, due to the second resilient member 22b between the fourth decoy 28d and fifth decoy 28e. The last decoy 28f installed along the main line or cord assembly 12a through 12e will move generally upwardly toward the top of the drawing Figure due to the force applied to the line 12e by means of the two resilient members 22c and 22d and line segment 12d installed therebetween.

It will be seen that the movement of the line segments 12c, 12d, and 12e, and the portion of the line segment 12b extending between the third corner post or stake 18c and the resilient member 22b, will not be in a precisely straight line between stakes or posts due to the action of the two auxiliary lines or cords 12f and 12g. In the case of the first auxiliary or branch line 12f, the lack of any resilient member therealong will result in its attachment end with the line 12b, defining an arc having a fixed radius as the line 12b is moved. The fixed radius of this arc will result in some lateral movement of the connection of the second line segment 12b and second resilient member 22b, generally toward the auxiliary anchor stake or post 26b. In a similar manner, the second auxiliary line segment 12g moves in an arc of fixed radius as the line segments 12c, 12d, and 12e are drawn toward the first end 14 of the first segment 12a, through the various corner stakes or posts 18a through 18d.

The precise movement and movement path of each of the decoys 28a through 28g is also dependent upon the specific spring rate of each of the resilient members or springs 22a through 22e used in the system 10a. For example, if a fifth spring or resilient member 22e is used which has a very low spring rate, i. e., a relatively low tensile force is required to stretch the spring 22e to a relatively great extent compared with the other springs in the system, then the corresponding movement of the decoy 28f will be on the order of (but still somewhat less than) the other decoys in the system. On the other hand, if the springs or resilient members 28a through 28e are provided with progressively higher spring rates in the order of their installation along the system 10a, then the first decoy 28a would have the greatest movement, with other decoys having less movement until the final decoy 28f, which would have the least movement of the assembly.

It will also be seen that the movement of any decoy installed along any of the auxiliary or branch lines is affected not only by the movement of the main line segments to which the branch lines are attached, but also by the proximity of the decoy to the respective anchor stake for that branch or auxiliary line. For example, the decoy 28g is placed somewhat closer to the anchor stake 26b than to the connection of the auxiliary or branch line 12f to the second line segment 12b. As the auxiliary anchor stake 26b is fixed in position, the closer an object is to that anchor stake, the less movement it will have when the system 10a is operated.

Accordingly, the present pulley action decoy system enables a hunter, bird watcher, etc. to customize the deployment or layout of the system as desired, depending upon the geographic features of the area in which the system is deployed and other factors which may be taken into account. The present system not only provides for movement in different directions for a series of decoys, but also for different magnitudes of movement of those decoys, depending upon the use of auxiliary or branch lines and/or different spring rates for the resilient members or springs which may be used in the present system.

Figure 3:
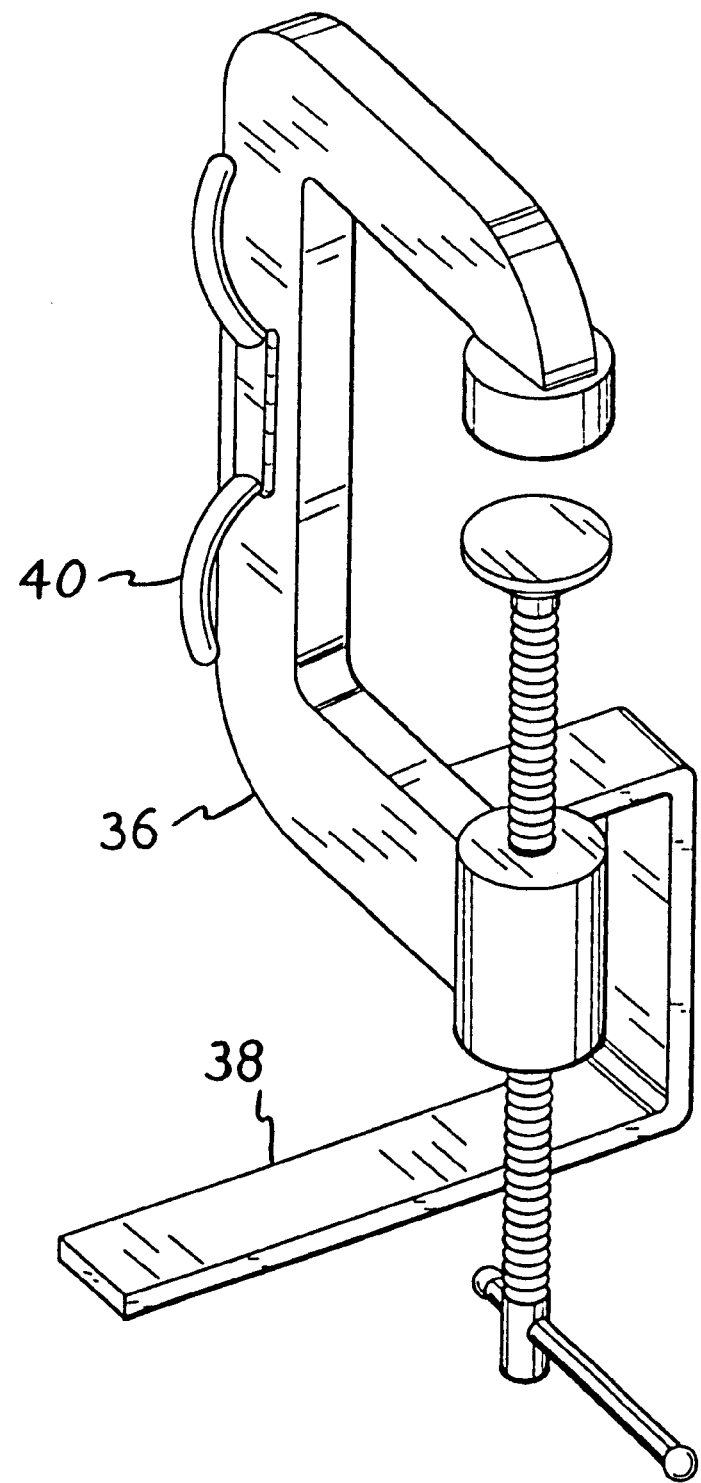
FIG. 3 is a perspective view of a tie-off clamp used for securing the first end of the actuation line of the present system.

FIGS. 3 through 8 provide detailed views of the various components of the present pulley action decoy system. FIG. 3 provides a detailed perspective view of the tie-off clamp and cord holder 30 which is removably secured in the blind B or other structure, for securing the operating end 14 of the actuating line 12. The clamp and cord holder 30 is based upon a conventional C-clamp 36, but includes a line or cord holder arm or bracket 38 which is permanently affixed (welded, etc.) to the body of the clamp 36. A cleat 40 for tying off the operating end 14 of the line 12 is also welded or otherwise permanently affixed to the body of the clamp 36. The clamp and cord holder 30 is removably secured to some convenient structure (side panel, seat, structural member, etc.) within the blind B, with the operating end 14 of the line 12 being secured about the cleat 40 as desired. The free portion of the operating end 14 of the line 12 is placed upon the cord holder arm or bracket portion 38 of the assembly 30.

When the hunter H wishes to move the decoys 28 distributed along the length of the line 12, he need only untie or unwrap the operating end 14 of the line 12 from the cleat 40 and draw the operating end 14 of the line 12 into the blind B as desired. The hunter H may then tie off the line 12 at the new position, with the resilient member(s) 22 being at least partially extended, or may allow the resilient member(s) to draw the line 12 outwardly again as desired. If the operating end 14 of the line 12 is tied off with tension in the spring(s) 22, then the hunter need only untie or unwrap the operating end 14 of the line 12 and allow the line 12 to pay out as the spring(s) 22 pull the line outwardly to their rest position, to allow the decoy(s) 28 to move back to their respective rest positions.

Figure 4:
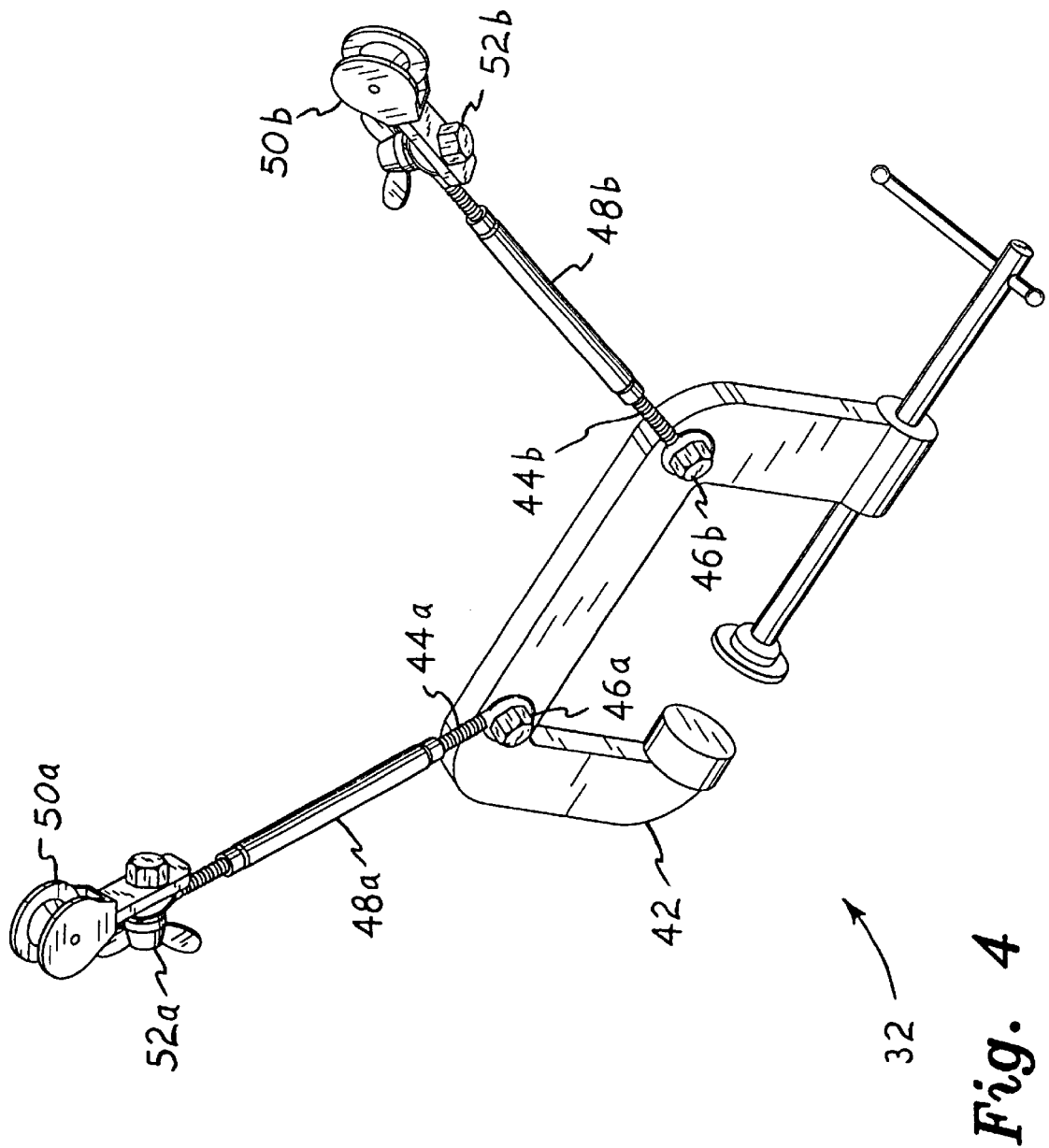
FIG. 4 is a perspective view of a clamp pulley assembly used for guiding the actuation line of the system from the blind.

FIG. 4 provides a detailed perspective view of the guide pulley clamp assembly 32, which is removably secured to the forward edge of the blind B for guiding the line 12 outwardly from the blind B. As in the case of the line holder clamp 30 of FIG. 3, the body of the guide pulley clamp assembly 32 comprises a conventional C-clamp 42, which may be removably secured to the forward edge of the blind B as shown in FIGS. 1 and 2. First and second arms, respectively 44a and 44b, are adjustably secured to the C-clamp body 42 by means of bolts 46a and 46b, allowing the two arms 44a and 44b to be arcuately adjusted relative to the clamp body 42 as required. Each of the arms 44a and 44b is also adjustable in length, by means of respective turnbuckles 48a and 48b.

Each of the arms 44a and 44b includes a low friction pulley, respectively 50a and 50b, extending from its distal end opposite the attachment bolts 46a and 46b. The pulleys 50a and 50b, and other pulleys utilized in the present system, are preferably of the sealed bearing type, in order to withstand submersion without undue damage thereto. (While the pulleys 50a and 50b of the clamp assembly 32 are not normally submerged, they may be subject to rain and/or high humidity conditions in the field, and are preferably interchangeable with other submersible pulleys used in the present invention in order to simplify the assembly of components in the field or elsewhere.) The arcuate positions of the two pulleys 50a and 50b may be adjusted by means of respective pulley attachment bolts and wing nut assemblies 52a and 52b. The actuating line 12 is passed over (or through) the two pulleys 50a and 50b, with the guide pulley clamp assembly 32 serving to guide the line 12 outwardly from the blind B to the next component of the system (i.e., the guide pulley stake 34) disposed outside of the blind B.

Figure 5:
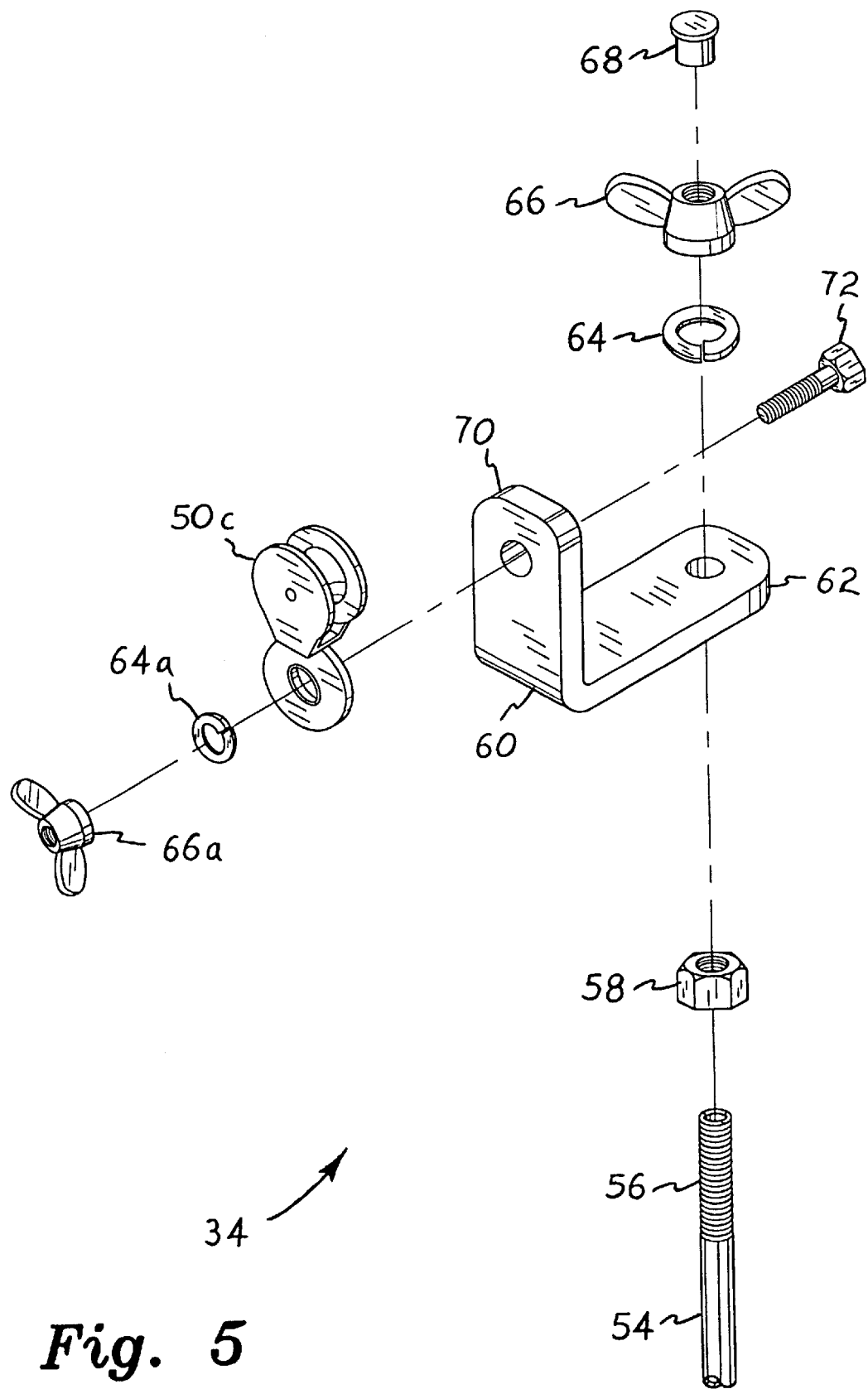
FIG. 5 is an exploded perspective view of a guide pulley and post assembly used for guiding the actuation line of the system.

FIG. 5 illustrates an exploded perspective view of the components comprising the guide pulley stake assembly 34. A stake or post 54 has a threaded upper end 56, over which a mating nut 58 is secured. (The stake 54 may be hollow, as shown in FIG. 4, or may be a solid rod, as shown in other drawing Figures.) The length of the threaded portion 56 allows the nut 58 to be adjustably installed to position the height of other components (described below) as desired.

A ninety degree bracket 60 has a first or horizontal end 62 which is placed over the threaded end 56 of the stake 54, bearing against the stop nut 58. A lock washer 64 and wing nut 66 are secured atop the horizontal end 62 of the bracket 60, to secure it to the stake or post 54. Finally, a protective plastic cap 68 is placed over the exposed threaded end 56 of the stake 54 to protect the otherwise exposed threads from damage. The opposite vertical end 70 of the bracket 60 is used for the attachment of a low friction pulley 50c thereto (similar to the pulleys 50a and 50b of the guide pulley clamp 32 of FIG. 4), by means of a bolt 72, lock washer 64a, and wing nut 66a. The guide pulley stake assembly 34 is set into the bottom of the body of water W in front of the blind B, as shown generally in FIGS. 1 and 2, to guide the line 12 downwardly below the surface of the water W from the guide pulley clamp 32 secured to the front of the blind B.

Figure 6:
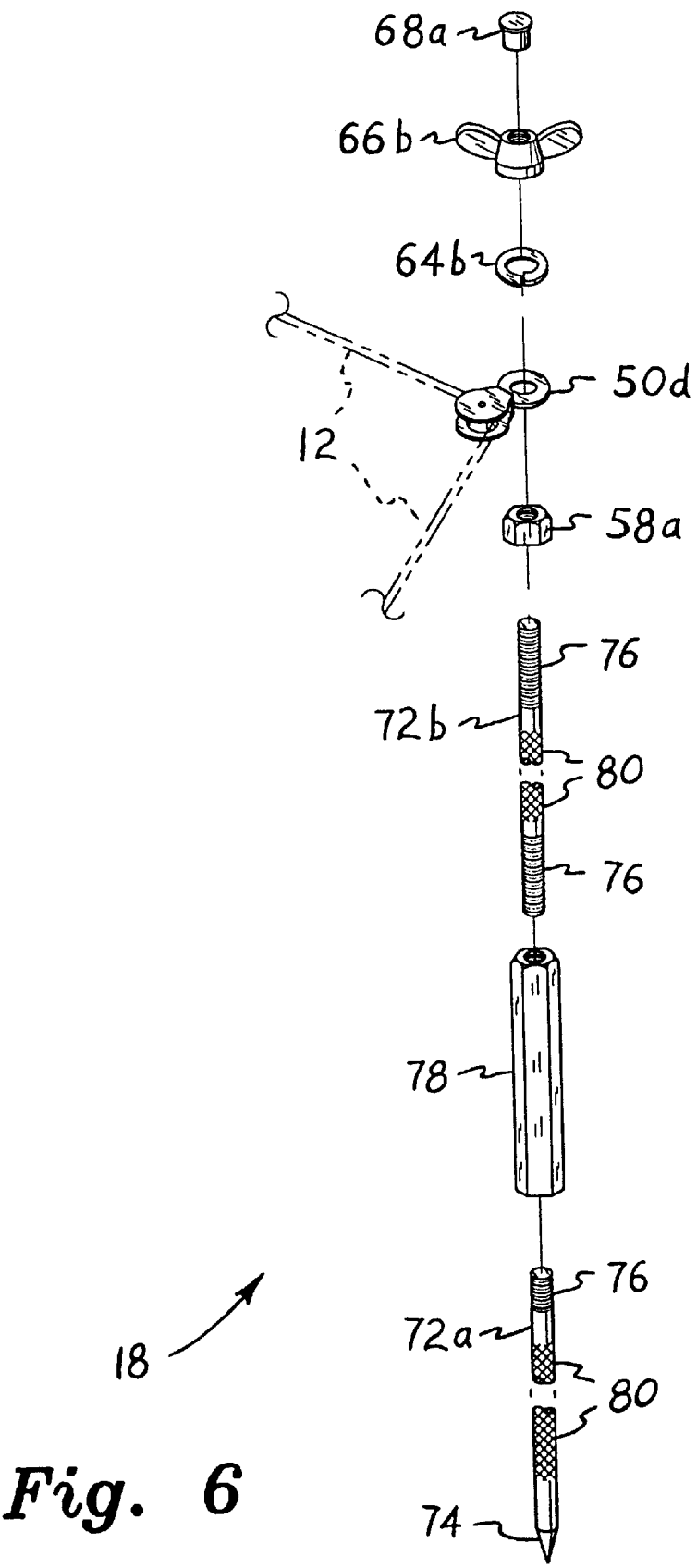
FIG. 6 is an exploded perspective view of a corner pulley and post assembly for guiding the actuation line of the system.

FIG. 6 provides an exploded perspective view of an exemplary arrangement for a corner pulley stake 18, for guiding the line or cord 12 about changes in direction in the layout of the present system as exemplified in FIGS. 1 and 2. The corner pulley stake assembly 18 of the present invention is preferably a modular assembly, with components providing for assembly in different orders and with different numbers and lengths of components to accommodate different water depths, different layouts of the line 12, etc. as desired.

In the exemplary corner pulley assembly 18 of FIG. 6, the corner stake comprises a first or lowermost stake section 72a having a sharpened or pointed lowermost end 74, for driving into the bottom of the body of water W. One or more intermediate and/or upper stake sections 72b may be combined with a lowermost section 72a as required to provide the required height for the assembly 18, depending upon the depth of the water in which the stake assembly 18 is being installed. Various lengths of such intermediate and/or uppermost sections 72b may be provided as needed, e. g., in several different lengths such as six, twelve, and eighteen inches in length, etc. For example, if a post or stake 18 having a length of thirty inches is desired, three such sections having respective lengths of six, twelve, and eighteen inches may be assembled together. The modular nature of such a combination of components enables any length of stake from six inches to thirty inches to be assembled, in six inch increments.

The upper end of the lowermost stake component 72a, and both the upper and lower ends of the other stake components 72b, include threaded portions 76 thereon to provide for the assembly of the various sections together as desired. One or more coupling nuts 78 are used to join each of the sections 72a and 72b together in whatever total length and number is required. Each of the stake or post sections 72a and 72b preferably includes a knurled portion 80 generally centrally disposed along the lengths thereof, to allow the person assembling the stake assembly 18 to gain a good grip for a secure assembly.

The uppermost end of the stake assembly 18 has a stop nut 58a adjustably installed thereon, in the manner of the stop nut 58 of the assembly 34 shown in FIG. 5. A low friction pulley 50d (essentially identical to the pulleys 50a through 50c discussed further above) is installed atop the stop nut 58a, with the pulley axis being vertically oriented so the actuating line 12 passing therearound makes a horizontal change of direction, generally as shown in FIG. 6 and in the environmental perspective and schematic plan views respectively of FIGS. 1 and 2. A lock washer 64b and wing nut 66b are used to secure the pulley 50d to the upper end of the stake assembly 72a and 72b, with a protective plastic cap 68a placed atop the upper threaded end of the assembly 72a and 72b.

It will be noted that the hollow stake or post 54 of FIG. 5 may be substituted for the solid rod segments comprising the assembly 72a and 72b of FIG. 6, if so desired. The hollow post 54 may also be provided in a series of different lengths, using one or more coupling nuts to join the sections in any practicable length and number desired, as described in the assembly of the corner pulley stake 18 shown in FIG. 6. For use of the assembly 34 of FIG. 5 as a corner post, the right angle bracket 60 may be eliminated and the pulley 50c assembled directly atop the stop nut 58. Alternatively, the right angle bracket 60 may be secured to the top of a solid rod assembly 72a and 72b in lieu of the pulley 50d, with the pulley then being assembled to the vertical end 70 of the bracket 60 to provide a guide pulley stake assembly, if desired.

Figure 7:
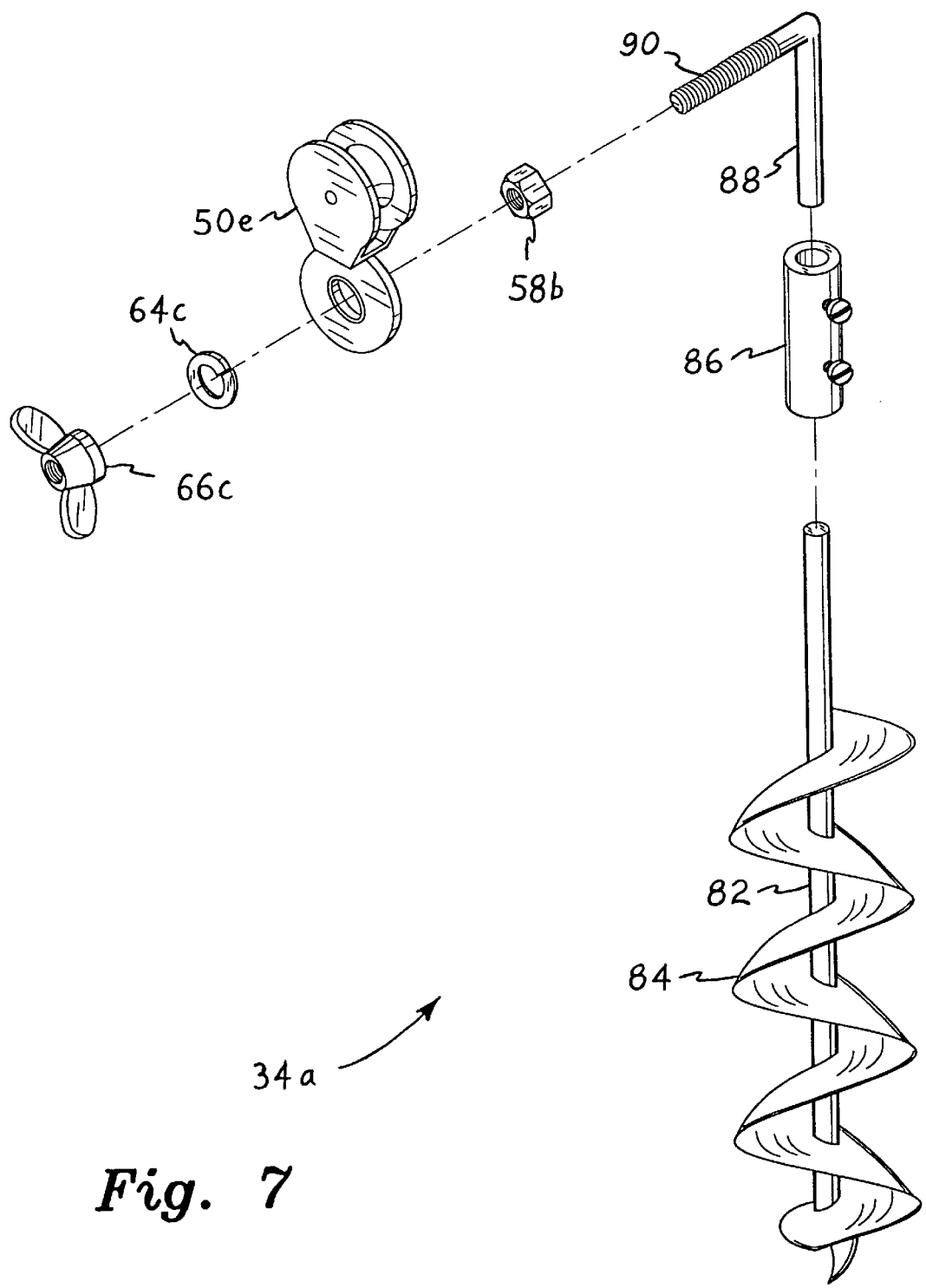
FIG. 7 is an exploded perspective view of an alternative guide pulley and post assembly for use in the present system.

FIG. 7 provides an exploded perspective view of yet another guide stake assembly configuration, designated as assembly 34a. The stake component 82 of FIG. 7 includes a helical flange 84 therearound, with the stake 82 being screwed into the ground for anchoring the stake 82 and components secured thereto. A tubular coupling 86, such as those used in connecting sections of EMT (electrical metal tubing) conduit together, may be used to connect a right angle rod 88 to the upper end of the stake 82. The rod 88 includes a threaded horizontal portion 90, to which a stop nut 58b and pulley 50e are assembled using a lock washer 64c and wing nut 66c, in the manner of the corner stake assembly 18 of FIG. 6. However, the ninety degree bend in the rod 88 orients the pulley 50e with its axis disposed horizontally, in the manner of the pulley 50c of the guide pulley stake assembly 34 of FIG. 5. It will be seen that the upper rod 88 could be formed without the bend, or the upper end of the helical stake 82 could be threaded for using such a modified assembly of FIG. 7 as a corner stake, with the pulley 50e oriented with its axis disposed vertically.

Figure 8A:
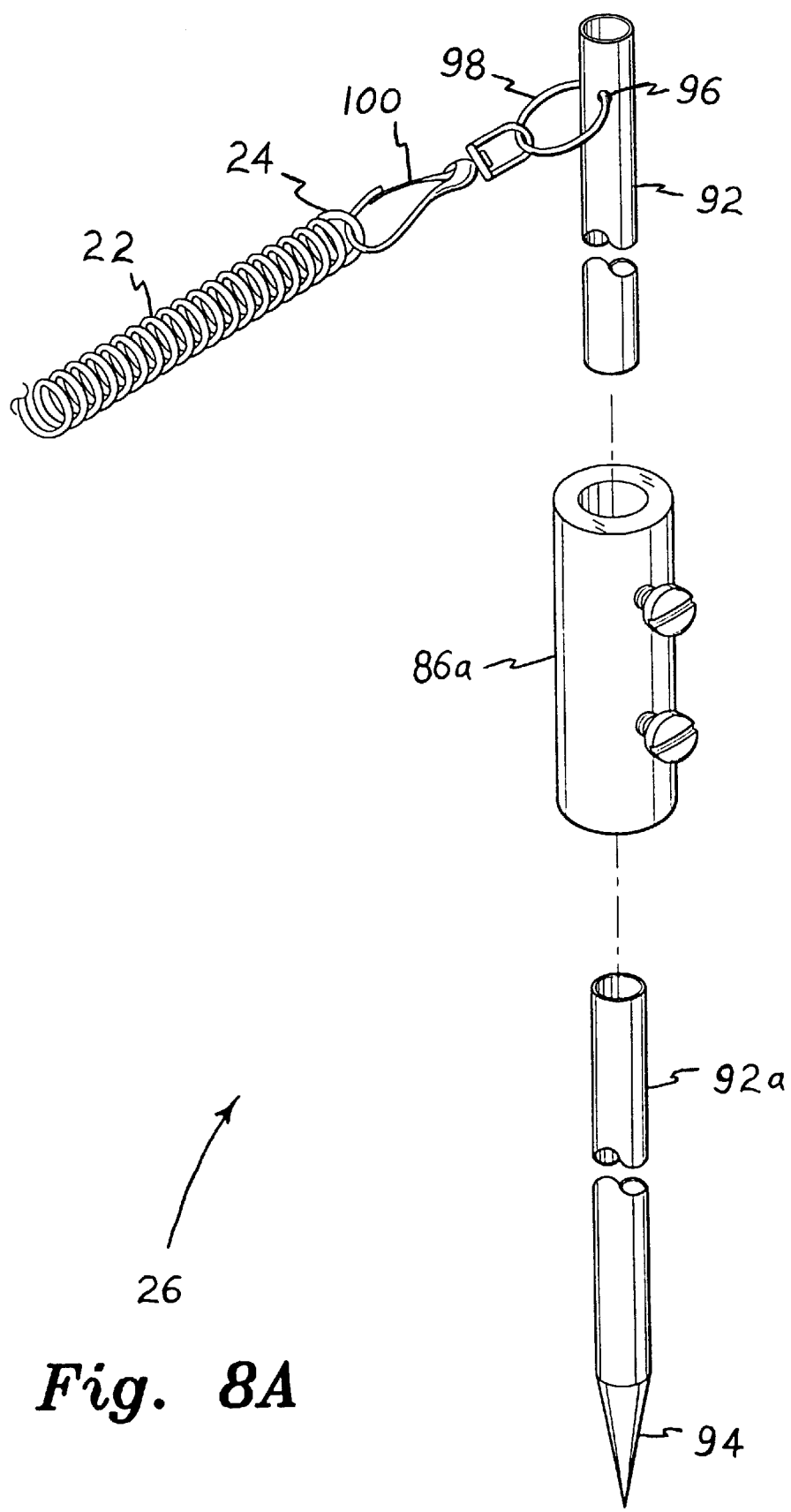
FIG. 8A is an exploded perspective view of an anchor post assembly for use with the present pulley action decoy system.

FIG. 8A discloses an exemplary anchor stake or post assembly 26. The assembly 26 of FIG. 8A comprises at least one hollow, tubular stake 92, similar to the hollow stake 54 shown in FIG. 5 and used for the guide pulley stake assembly 34. As in other stake assemblies disclosed herein, the assembly 26 may be formed of two or more sections of tubular stake material such as the emt material noted further above, comprising at least one upper section 92 and a lowermost or bottom section 92a having a sharpened lower end 94. (While the sharpened end 94 is shown as a solid, pointed component, it will be seen that such a sharpened end could be formed by cutting the lower end of the tube 92a at an angle, and/or flattening the lower end and sharpening the flattened material.) The various sections 92 and 92a may be left unthreaded, and connected together using an emt coupling 86a, identical to the coupling 86 illustrated in FIG. 7 of the drawings. The uppermost end of the upper section 92 includes a generally diametric passage 96 therethrough, with a retaining ring 98 installed therethrough. The retaining ring 98 in turn is used to secure a swivel snap 100 thereto, which is used to secure the second or anchor post attachment end 24 of a resilient member (spring) 22 thereto, in the manner shown generally in FIG. 1 of the drawings. As in other assemblies discussed further above, it will be seen that alternative components may be used for the anchor post assembly 18, e. g., threaded solid rod or hollow tube for the stake components, etc., as desired.

Figure 8B:
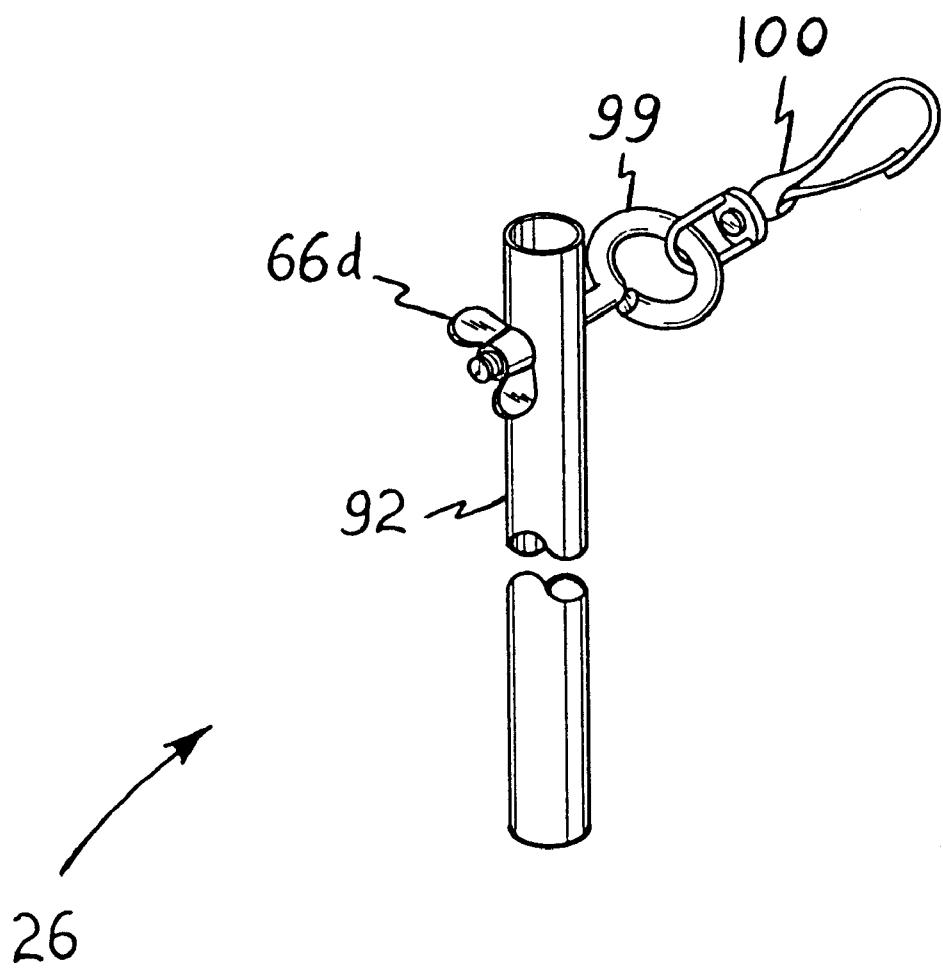
FIG. 8B is an exploded perspective view of an alternative line or spring attachment means for the anchor post of FIG. 8A.

FIG. 8B illustrates an alternative means for attaching the resilient member 22 of FIG. 8A to the anchor stake assembly 26. In FIG. 8B, a conventional hole or passage (not shown) is formed through the upper end of the stake 92, and an eye bolt 99 is secured therethrough by a wing nut 66d or the like. A swivel snap 100, as in the snap 100 of FIG. 8A, is secured through the eye of the eye bolt 99 for securing the attachment end 24 of the spring 22 thereto. (The spring 22 is not shown in FIG. 8B, but is the same as that shown in FIG. 8A of the drawings.)

Figure 9A:
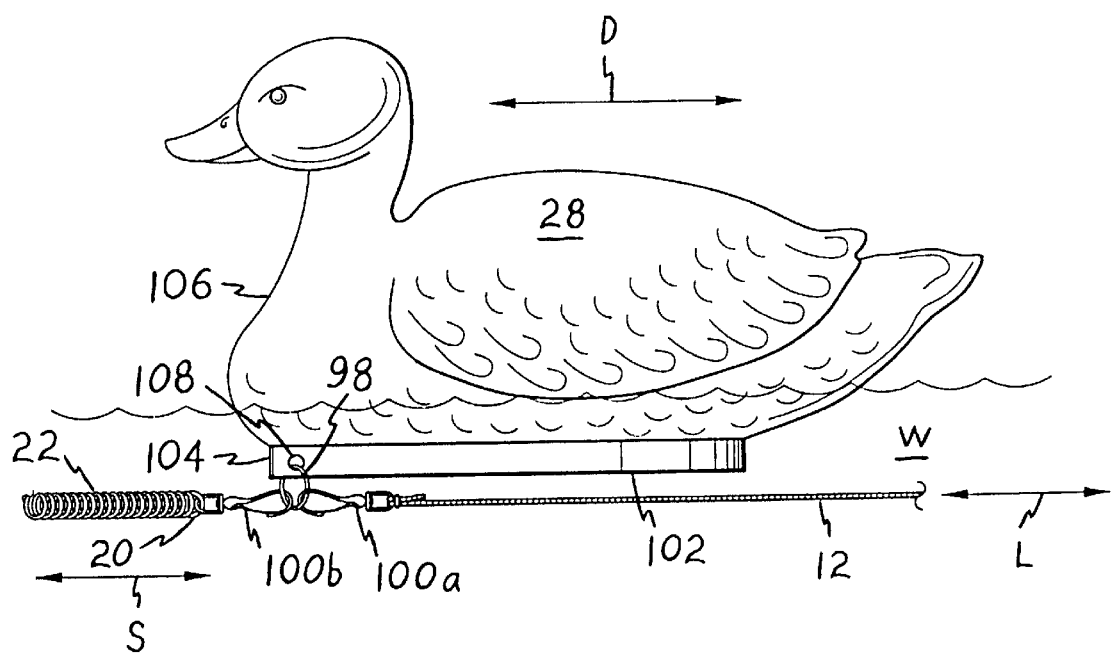
FIG. 9A is a side elevation view showing the linkage details for securing a decoy to the actuation line of the present system.

FIG. 9A provides a detailed view of the attachment of an exemplary floating decoy 28 to the actuation line 12 of the present decoy system, for moving the decoy 28 horizontally over or across the surface of the water W. The decoy 28 is essentially identical to the other decoys 28a through 28g shown schematically in FIG. 2, with the decoys each having a conventional ballasted keel 102 extending longitudinally thereunder for stability. The keel 102 has a forward portion 104, with the decoy 28 having a corresponding front portion 106.

The keel 102 has an eye or passage 108 formed through its forward portion 104, with a retaining ring 98 (essentially the same as the retaining ring 98 used in the anchor post or stake assembly 26 detailed in FIG. 8A of the drawings) installed therethrough. A first swivel snap 100a is used to attach the end of the actuation line 12 to the retaining ring 98, with a second swivel snap 100b being used to secure the first end 20 of a resilient member (spring) 22 to the retaining ring 98. (The two swivel snaps 100a and 100b are essentially the same as the swivel snap 100 shown in FIG. 8.) While the exemplary decoy attachment assembly illustrated in FIG. 9A shows the decoy 28 being secured to both the actuation line 12 and to a resilient member 22, it should be noted that the second swivel snap 100b could also be used to attach another segment of actuation line to the decoy 28, in the manner indicated in FIGS. 1 and 2, if desired.

Drawing on the actuation line 12 toward the right side of FIG. 9A, as indicated by the line movement arrow L, will be seen to pull the decoy 28 in that direction, as shown by the decoy movement arrow D, against the resilient pull of the spring 22 or other resilient member used in the assembly, indicate by the spring pull arrow S. The decoy 28 will naturally tend to pivot to face its front portion 106 in the direction of movement, due to the forward attachment of the retaining ring 98 to the keel 102. When tension is released on the actuating line 12, the resilient member 22 will contract, turning the decoy 28 back toward the resilient member 22 and drawing the decoy 28 back to its original position.

Figure 9B:
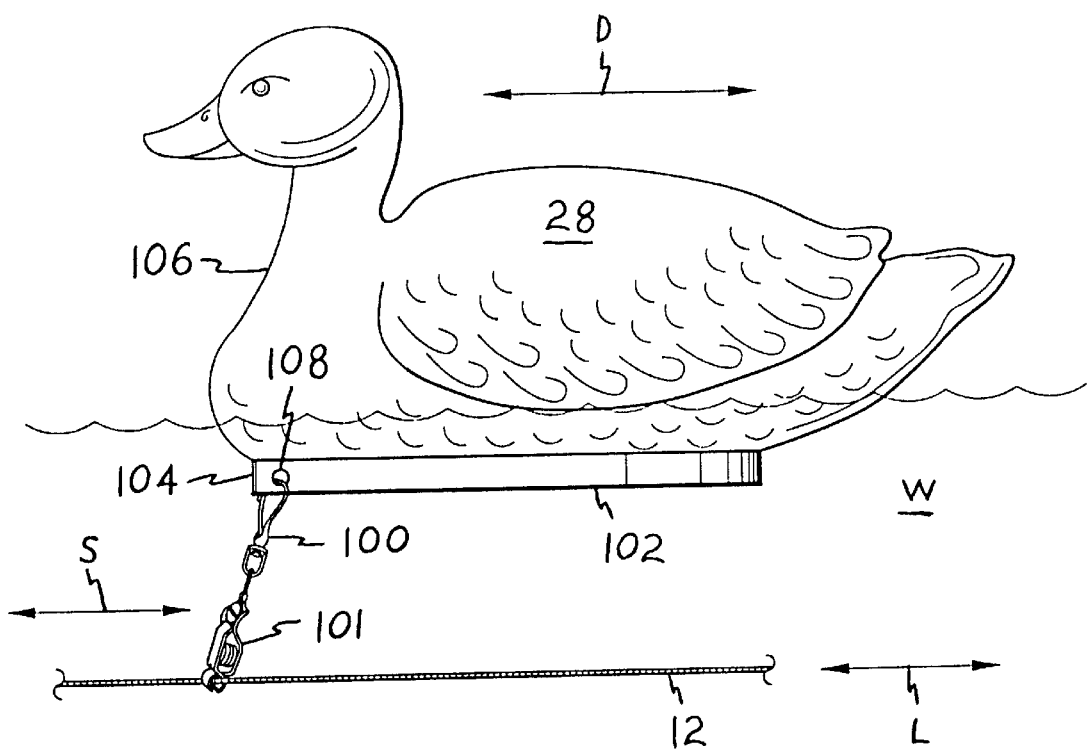
FIG. 9B is a side elevation view showing an alternative means for connecting a decoy to the actuation line.

FIG. 9B illustrates an alternative means for attaching the decoy 28 to the line 12, where the line 12 is a continuous unbroken length. The decoy 28 is essentially identical to the decoy 28 of FIG. 9A, having a keel 102 with a forward portion 104 and a hole or passage 108 formed therethrough. The decoy 28 includes a corresponding front portion 106. However, the actuating line 12 is continuous, rather than being broken and connected to the decoy 28 by two swivel snaps, as in the assembly of FIG. 9A. Instead, a swivel snap 100, identical to the swivel snap 100 of the assembly of FIGS. 8A and 8B, is secured to the eye or passage 108 through the forward portion 104 of the decoy keel 102. The swivel snap 100 of FIG. 9B includes a spring clip 101 (e. g., alligator clip, etc.) connected thereto, as an integral part thereof. The clip 101 may be secured to any point along the line 12 to provide placement of the decoy 28 in any location along the line 12, as desired.

Figure 10:
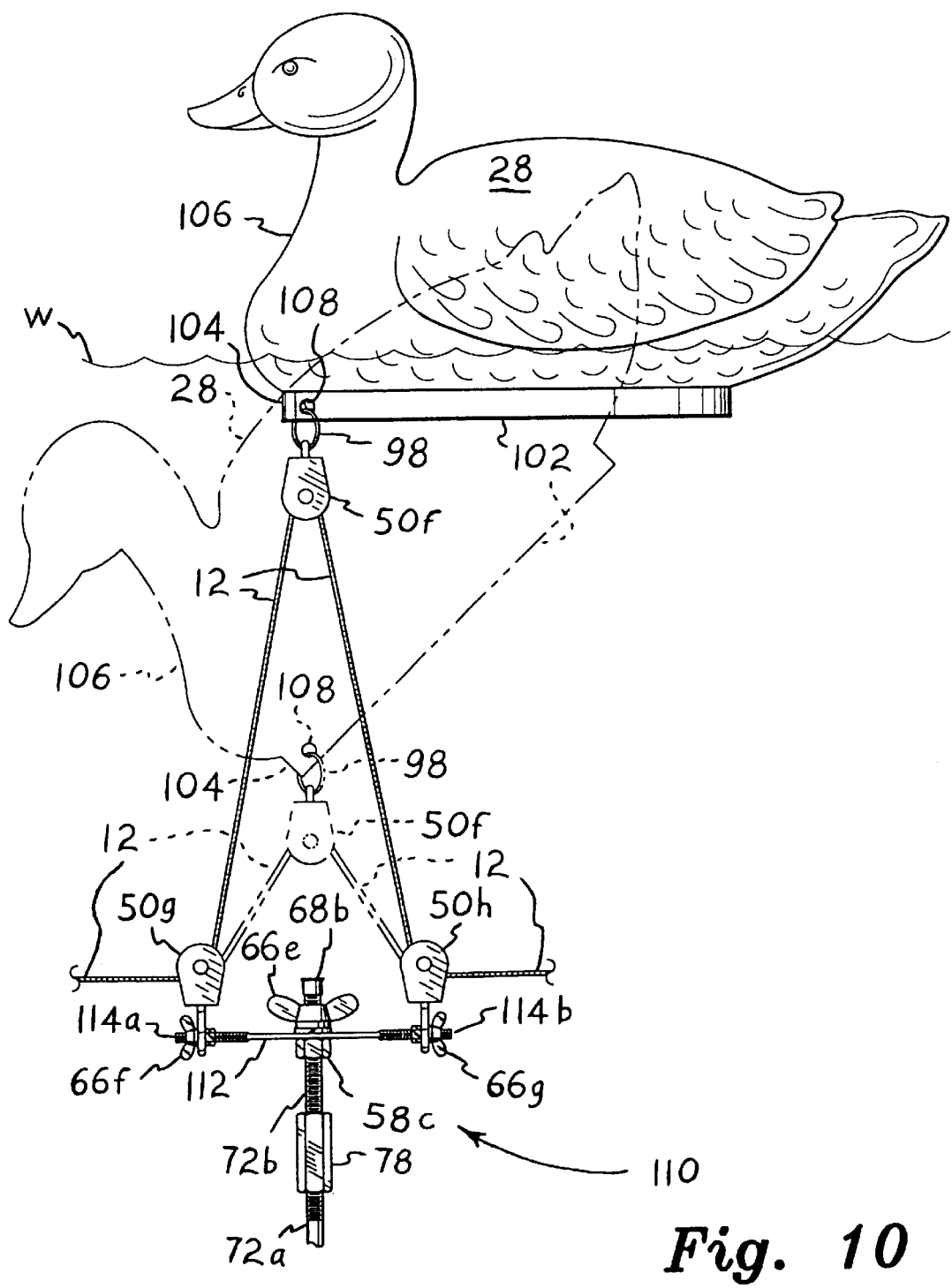
FIG. 10 is a side elevation view of a decoy dipping or diving mechanism assembly, for causing the decoy to dip its head for simulating the feeding action of a waterfowl in shallow water.

FIG. 10 illustrates an alternative embodiment of the decoy movement means provided by the present pulley action decoy system. Using the mechanism illustrated in FIG. 10, a decoy 28 may be made to dip its front portion 106 downwardly, in the manner of a live waterfowl dipping its head and forward portion below the surface of the water momentarily to feed on the shallow bottom. A retaining ring 98 is secured through the eye or passage 108 formed through the forward end 104 of the keel 102, in essentially the same manner as that shown for attaching the decoy 28 to the line 12 in FIG. 9A and discussed above. However, rather than securing one end of the line 12 to the retaining ring 98, as shown in FIG. 9A for providing horizontal movement for the decoy 28, a low friction pulley 50f (essentially the same as other pulleys 50 through 50e shown and described herein) depends from the ring 98, with an intermediate portion of the line 12 passing therethrough.

A decoy dipping or ducking mechanism 110 is secured in the bottom of the body of water W where the present system is deployed, with the upper portion well below the water surface. The mechanism 110 comprises one or more stake sections, such as the solid rod sections 72a and 72b shown in FIG. 5 (or alternatively, hollow rod sections as shown in FIG. 6, etc.) with a dual pulley bracket 112 secured to the upper end thereof. A stop nut 58c, lock washer, and wing nut 66e may be used to secure the bracket 112 to the upper end of the rod 72b with a cap 68b placed over the end of the rod section 72b, in the manner of the corresponding components 58 through 58b, 66 through 66c, and 68 and 68a described further above.

The bracket 112 essentially comprises a central portion configured for securing to the support rod as described above (e.g., flattened with an attachment passage formed therethrough, etc.) with opposed threaded rod ends, respectively 114a and 114b, extending therefrom and to each side of the support rod. Each of the rod ends 114a and 114b has a stop nut assembled thereto, in the manner used in the assembly of other components described further above, with the attachment lugs of a first and a second low friction pulley, respectively 50g and 50h, sandwiched between the stop nuts and a lock washer and wing nut 66f and 66g, again in the manner used for the assembly of various components of the present system as described further above. (Only the two wing nuts 66f and 66g of the first and second pulley attachment assemblies are designated specifically in FIG. 10, for clarity in the drawing.)

The actuating line 12 extends through the first pulley 50g of the dipping mechanism 110, upwardly to pass through the pulley 50f depending from the decoy keel 102, and downwardly to pass through the second pulley 50h. Assuming the operating end of the line 12 is oriented to the left of the drawing in FIG. 10, a pull on the line 12 would draw the line 12 toward the left, with the opposite right side of the line 12 remaining relatively stationary (excepting the extension of any resilient members in the system between the right side of the line 12 and a fixed anchor post or stake). It will be seen that this will shorten the path of the line 12 about the three pulleys 50g, 50f, and 50h, drawing downwardly the central pulley 50f attached to the decoy 28.

As the decoy 28 is conventional, the buoyancy of the decoy 28 resists the downward pull. However, as the depending pulley 50f is secured to the decoy 28 at the front end 104 of the keel 102, the forward end 104 of the keel 102 will be drawn downwardly into the water W, thus drawing the front portion 106 of the decoy 28 downwardly with the remainder of the decoy 28 continuing to float upwardly, generally assuming the position or orientation shown in broken lines in FIG. 10. This head down position of the decoy 28 provides a very realistic simulation of a duck or other waterfowl which has dipped its head and forward body downwardly beneath the surface of the water, as occurs when the bird is feeding upon some organisms on the bottom of a relatively shallow body of water.

In summary, the present pulley action decoy system provides a hunter or other person with a most realistic means of simulating the movement of waterfowl upon the surface of a body of water. The modular nature of the present system allows the various components to be assembled in virtually any practicable order or configuration, with various layouts providing for apparently random movement of decoys in any of a number of different directions. The provision for multiple springs or other resilient members provides differing magnitudes of motion for decoys placed at different points along the actuating line, with the provision for branch or auxiliary lines providing even further versatility for the present system.

The provision of multiple lengths for the various stakes or posts enables the present decoy system to be deployed in virtually any practicable body of water which is sufficiently shallow to attract waterfowl to rest and feed thereon. The provision of e.g., three different lengths of stakes or posts of six, twelve, and eighteen inches in length, enables the hunter to assemble such stakes having a length anywhere from six to thirty inches, plus or minus three inches due to the six inch increments. This wide range enables the hunter to set the upper ends of the stakes, and pulleys and/or other components attached thereto, at some depth below the surface of the water by driving the stakes or posts to the required depth, in order to conceal the mechanism below the surface of the water.

While the present decoy system is particularly directed to providing for horizontal movement of a plurality of decoys on the surface of a body of water, another embodiment provides for the dipping of the forward portion of a decoy to mimic a live waterfowl feeding on the bottom of a shallow body of water. This mechanism, when connected to one or a small number of decoys in combination with the mechanism providing for horizontal movement of other decoys, provides a quite realistic system for efficiently attracting waterfowl to a hunter or other person as desired, and will prove to be a valuable addition to a hunter's equipment.

It is to be understood that the present invention is not limited to the embodiments described above, but encompasses any and all embodiments within the scope of the following claims.

We claim:

1. A pulley action decoy system, comprising:
    a plurality of buoyant waterfowl decoys;
    at least one manually operated flexible actuating line removably secured directly to said decoys for simultaneously and collectively moving said decoys across the surface of a body of water in which said decoys are floating, with said at least one actuating line having an operating end and a distal end opposite said operating end;
    at least one corner stake for guiding said at least one actuating line along a path determined by placement of said at least one corner stake;
    said at least one corner stake having an upper end with a low friction pulley extending therefrom, with said at least one actuating line passing about said pulley of said at least one corner stake;
    at least one resilient member having a first end and a second end opposite said first end, with said first end of said resilient member being removably secured to said distal end of said at least one actuating line;
    at least one anchor stake, with said second end of said at least one resilient member being removably secured thereto;
    at least one clamp and pulley assembly for removably clamping to a fixed point adjacent said operating end of said at least one actuating line, for guiding said at least one actuating line from the fixed point; and
    at least one tie off clamp adjacent said operating end of said actuating line, for temporarily securing said operating end of said actuating line as desired.

2. The pulley action decoy system according to claim 1, wherein said at least one corner stake and said,at least one anchor stake each comprise multiple sections for modular assembly for forming variable lengths as desired, for selectively deploying said system in different bodies of water having different depths from one another.

3. The pulley action decoy system according to claim 1, including a plurality of said corner stakes disposed in a nonlinear array for defining said path of said at least one actuating line as nonlinear.

4. The pulley action decoy system according to claim 1, including at least one auxiliary line branching from said at least one actuating line.

5. The pulley action decoy system according to claim 4, including a plurality of resilient members disposed at different locations from one another along said at least one actuating line and said at least one auxiliary line.

6. The pulley action decoy system according to claim 5, wherein at least two of said plurality of resilient members each have different spring rates from one another.

7. The pulley action decoy system according to claim 5, wherein said plurality of resilient members comprise coil springs.

8. The pulley action decoy system according to claim 1, including at least one intermediate guide pulley disposed between said clamp and pulley assembly and the first of said plurality of decoys, for guiding said actuating line from a path above the surface of the water to a path below the surface of the water.

9. The pulley action decoy system according to claim 1, including:
    at least one of said plurality of decoys having a front portion and a keel portion having a forward portion with a low friction pulley depending therefrom;
    a decoy dipping mechanism affixed below said at least one of said plurality of decoys;
    said dipping mechanism including a first low friction pulley and a second low friction pulley spaced apart from said first pulley; and
    said at least one actuating line passing sequentially through said first pulley of said dipping mechanism, through said depending pulley of each of said at least one of said plurality of decoys, and through said second pulley of said dipping mechanism, with retraction of said operating end of said at least one actuating line drawing said depending pulley of said at least one of said plurality of decoys and said front portion of said at least one of said plurality of decoys downwardly into the water for simulating the feeding action of a waterfowl.

10. A pulley action decoy system, comprising:
    a plurality of buoyant waterfowl decoys;
    at least one manually operated flexible actuating line removably secured directly to said decoys for simultaneously and collectively moving said decoys across the surface of a body of water in which said decoys are floating, with said at least one actuating line having an operating end and a distal end opposite said operating end;
    at least one corner stake for guiding said at least one actuating line along a path determined by placement of said at least one corner stake;
    said at least one corner stake having an upper end with a low friction pulley extending therefrom, with said at least one actuating line passing about said pulley of said at least one corner stake;

at least one resilient member having a first end and a second end opposite said first end, with said first end of said resilient member being removably secured to said distal end of said at least one actuating line;

at least one anchor stake, with said second end of said at least one resilient member being removably secured thereto;

at least one of said plurality of decoys having a front portion and a keel portion having a forward portion with a low friction pulley depending therefrom;

a decoy dipping mechanism affixed below said at least one of said plurality of decoys;

said dipping mechanism including a first low friction pulley and a second low friction pulley spaced apart from said first pulley; and said at least one actuating line passing sequentially through said first pulley of said dipping mechanism, through said depending pulley of each of said at least one of said plurality of decoys, and through said second pulley of said dipping mechanism, with retraction of said operating end of said at least one actuating line drawing said depending pulley of said at least one of said plurality of decoys and said front portion of said at least one of said plurality of decoys downwardly into the water for simulating the feeding action of a waterfowl.

11. A pulley action decoy system, comprising:

at least one buoyant waterfowl decoy;

at least one manually operated flexible actuating line removably secured to said at least one decoy for moving said at least one decoy in a body of water in which said at least one decoy is floating, with said actuating line having an operating end and a distal end opposite said operating end;

at least one resilient member having a first end and a second end opposite said first end, with said first end of said at least one resilient member being removably secured to said distal end of said at least one actuating line;

at least one anchor stake, with said second end of said at least one resilient member being removably secured thereto;

said at least one decoy including a front portion and a keel portion having a forward portion with a low friction pulley depending therefrom;

a decoy dipping mechanism affixed below said at least one decoy;

said dipping mechanism including a first low friction pulley and a second low friction pulley spaced apart from said first pulley; and said at least one actuating line passing sequentially through said first pulley of said dipping mechanism, through said depending pulley of said at least one decoy, and through said second pulley of said dipping mechanism, with retraction of said operating end of said at least one actuating line drawing said depending pulley of said at least one decoy and said front portion of said at least one decoy downwardly into the water for simulating the feeding action of a waterfowl.

12. The pulley action decoy system according to claim 11, including at least one corner stake for guiding said at least one actuating line along a path determined by placement of said at least one corner stake.

13. The pulley action decoy system according to claim 12, wherein said at least one corner stake and said at least one anchor stake each comprise multiple sections for modular assembly for forming variable lengths as desired, for selectively deploying said system in different bodies of water having different depths from one another.

14. The pulley action decoy system according to claim 12, including a plurality of said corner stakes disposed in a nonlinear array for defining said path of said at least one actuating line as nonlinear.

15. The pulley action decoy system according to claim 11, including at least one auxiliary line branching from said at least one actuating line.

16. The pulley action decoy system according to claim 15, including a plurality of resilient members disposed at different locations from one another along said at least one actuating line and said at least one auxiliary line.

17. The pulley action decoy system according to claim 16, wherein at least two of said plurality of resilient members each have different spring rates from one another.

18. The pulley action decoy system according to claim 16, wherein said plurality of resilient members comprise coil springs.

19. The pulley action decoy system according to claim 11, including:

at least one clamp and pulley assembly for removably clamping to a fixed point adjacent said operating end of said at least one actuating line, for guiding said at least one actuating line from the fixed point; and at least one tie off clamp adjacent said operating end of said actuating line, for temporarily securing said operating end of said actuating line as desired.

20. The pulley action decoy system according to claim 19, including at least one intermediate guide pulley disposed between said clamp and pulley assembly and the first of said plurality of decoys, for guiding said actuating line from a path above the surface of the water to a path below the surface of the water.

* * * * *